Figures 1, 2, 3, 4:
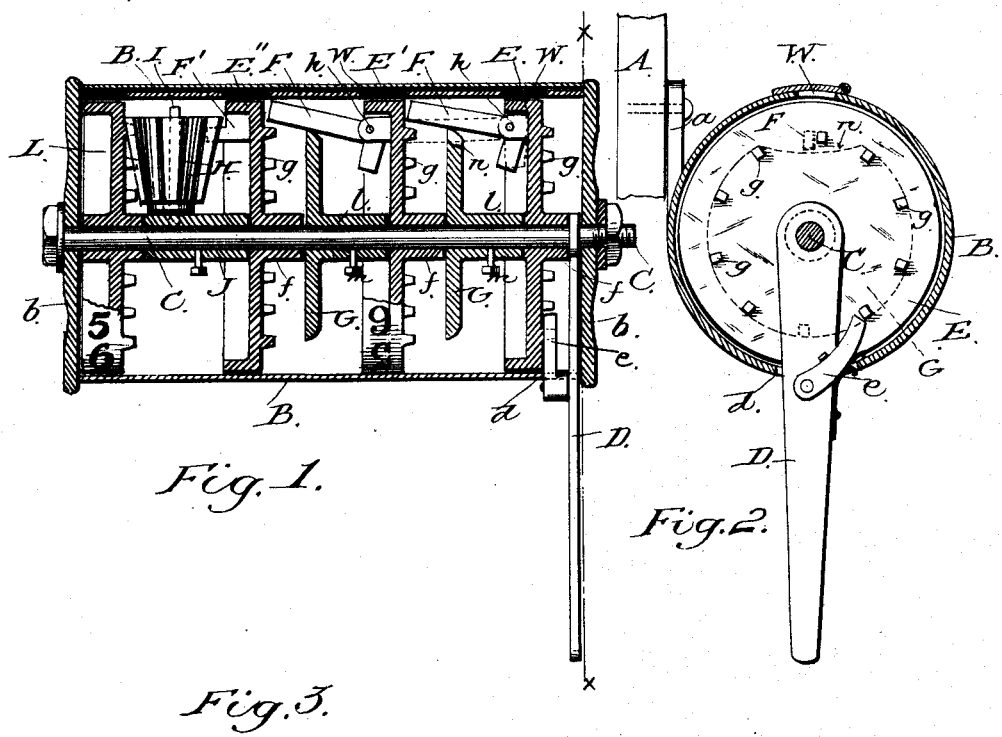

(No Model.)

J. B. McCUTCHEON.
GRAIN TALLY OR REGISTER.

No. 419,281. Patented Jan. 14, 1890.

WITNESSES
T. W. Fowler
W. H. Patterson

INVENTOR
John B. McCutcheon,
by A. H. Evans & Co.
his Attorneys

UNITED STATES PATENT OFFICE.

JOHN B. McCUTCHEON, OF BATTLE CREEK, MICHIGAN, ASSIGNOR OF ONE-HALF TO WILBUR M. HICKMAN, OF SAME PLACE.

GRAIN TALLY OR REGISTER.

SPECIFICATION forming part of Letters Patent No. 419,281, dated January 14, 1890.

Application filed May 22, 1889. Serial No. 311,702. (No model.)

*To all whom it may concern:*

Be it known that I, JOHN B. McCUTCHEON, a citizen of the United States, residing at Battle Creek, in the county of Calhoun and State of Michigan, have invented certain new and useful Improvements in Grain-Tallies; and I do hereby declare the following to be a full, clear, and exact description of the invention, such as will enable others skilled in the art to which it appertains to make and use the same.

Figure 1 represents a longitudinal sectional view of my improved grain-tally. Fig. 2 is a cross-sectional view on the line $x\ x$ of Fig.
1. Fig. 3 is a view of one of the cam-disks. Fig. 4 is a detail to be referred to.

My invention relates to certain new and useful improvements in grain-tallies; and it consists of the constructions and combinations of devices which I shall hereinafter fully describe and claim.

In the accompanying drawings, A indicates a portion of a grain-spout of any well-known kind, to which my improved tally is secured by an arm or projection $a$, or otherwise. This tally consists, essentially, of an exterior casing B, preferably cylindrical in form, and having the heads or disks $b$ at the ends. A shaft or rod C passes longitudinally through the casing and carries near one end the main lever D, which projects through a slot $d$ in the casing and is operated in the usual manner, the said lever having a pawl $e$, which operates the first of a series of numbered wheels that indicate the amount of grain passing through the measuring-spout. The wheels E, E', and E'' are loosely mounted on the shaft C, and are provided with hubs $f$, and said wheels have their peripheries formed or provided with figures, of which there may be any desired number, while one of the sides of each wheel is formed or provided with teeth or projections $g$, which are engaged by pawls or levers on the adjacent wheels, except the first wheel E, which is engaged by the pawl $e$, whereby said wheels are rotated at predetermined times, as I shall hereinafter fully describe. The wheels E and E' are also provided with lugs $h$, between which are pivoted the gravity-pawls F, and between the wheels E and E', E' and E'' are placed the cam-disks G, whose hubs $l$ are mounted on the shaft or rod C, and are secured thereto by set-screws $m$, whereby said disks are fixed in position between the movable wheels. The periphery of each disk G is cut away at $n$, as shown in Fig. 3, to receive the gravity-pawl of the adjoining numbered wheel and to permit the pawl of one wheel to engage the teeth of the next adjoining wheel, whereby said wheel is moved in unison to bring a new number in line with the opening W in the casing.

To make the movements of these parts more clear, I will state that when the main lever D is moved its pawl engages successively the teeth of the disk or wheel E, and moves the wheel each time of its movement a distance about equal to one number. As the wheel or disk moves it carries with it its pawl F, which normally rests by its own gravity against the periphery of the adjacent cam-disk, and is therefore out of connection with the next succeeding wheel E'. When the wheel E has about made a complete rotation, its pawl is brought into alignment with and drops into the cut-away portion $n$ of the adjoining cam-disk and enables the forward end of the pawl to drop between the teeth of the next wheel E' and to establish a connection between said wheel and the wheel E, so that when the wheel is again moved the wheel E' is also moved, but only a distance sufficient to bring a new number on the wheel E' into sight. The connection between the wheels E and E' is of short duration, for as the wheel E continues its rotation its pawl rides up the curved face of the cut-away portion of the cam-disk and onto the periphery of said disk, thereby breaking the connection between the wheels E and E', and keeping the pawl out of contact with the wheel E' until the wheel E has made another complete rotation, when the movement previously described is completed.

The pawl F of the wheel E' operates the wheel E'' in the same manner as the wheel E' is operated, a cam-disk G being placed between said wheels E' E'', and the wheel E'' being moved one number at the completion of each rotation of the wheel E', but the wheel E'', instead of carrying a pivoted pawl, is provided with a fixed pawl or projection F', which is adapted to engage at the completion of the rotation of wheel E" a bevel-pinion H, mounted on a stub shaft or pin I, projecting from a sleeve J, secured to the main shaft or rod, as shown in Fig. 1, the said gear meshing with the teeth or projection on the side of another numbered wheel L, and moving said wheel in a reverse direction a distance sufficient to bring a new number into line with the sight-openings in the main casing.

The casing, as previously described, has sight-openings W, by which the numbers on the wheel may be read, and these openings are closed by a hinged lid.

From this description it will be seen that I am enabled to register the number of bushels of grain passing through the grain-spout, and may increase or decrease the number of toothed or numbered wheels and cam-disks without departing from the spirit of my invention.

Having thus described my invention, what I claim as new, and desire to secure by Letters Patent, is—

1. The combination, with the casing, the shaft or rod, the main operating lever and pawl, wheels mounted on said shaft and having numbers on their peripheries and projections or teeth on one side, and pawls pivoted to the opposite side of the wheels and adapted to engage the teeth or projections of the adjoining wheel, of the disks G between the numbered wheels for holding the pawls out of connection with the teeth of the adjacent wheel, said disks having a cut-away or recessed portion into which the pawls drop, whereby connection between adjoining wheels is established, substantially as described.

2. The combination of the casing, the main shaft, the series of rotating wheels having projections or teeth, the main lever and pawls for effecting the movement of the first wheel, pawls carried by the wheels and forming a connection between adjoining wheels, the disks G between the adjoining numbered wheels, a wheel in the series having a fixed pawl or projection, a pinion engaged and operated thereby, and a numbered wheel engaged and driven by the pinion, substantially as described.

JOHN B. McCUTCHEON.

Witnesses:
ABRAHAM LAGASSEE,
NELSON E. HUBBARD.